United States Patent
Eberhard

(10) Patent No.: US 9,431,644 B1
(45) Date of Patent: *Aug. 30, 2016

(54) PRECONDITIONED BUS BAR INTERCONNECT SYSTEM

(71) Applicant: Atieva, Inc., Menlo Park, CA (US)

(72) Inventor: Martin Forest Eberhard, Woodside, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/692,285

(22) Filed: Apr. 21, 2015

Related U.S. Application Data

(63) Continuation-in-part of application No. 14/691,932, filed on Apr. 21, 2015.

(51) Int. Cl.
| | |
|---|---|
| *B23K 31/02* | (2006.01) |
| *H01M 2/24* | (2006.01) |
| *H01M 2/20* | (2006.01) |
| *B23K 15/00* | (2006.01) |
| *B23K 11/00* | (2006.01) |
| *B23K 20/10* | (2006.01) |
| *B23K 20/00* | (2006.01) |

(52) U.S. Cl.
CPC ............... *H01M 2/24* (2013.01); *B23K 11/00* (2013.01); *B23K 15/0046* (2013.01); *B23K 20/00* (2013.01); *B23K 20/008* (2013.01); *B23K 20/10* (2013.01); *B23K 26/21* (2015.10); *H01M 2/206* (2013.01); *H01M 2220/20* (2013.01)

(58) Field of Classification Search
CPC .... H01M 2/30; H01M 10/04; H01M 10/058; H01M 2/202; H01M 2/26; H01M 2/024; H01M 2/263; Y02T 10/7005; B23K 31/02; B23K 20/002; B23K 26/40
See application file for complete search history.

(56) References Cited

U.S. PATENT DOCUMENTS

| | | | | |
|---|---|---|---|---|
| 2014/0230226 | A1* | 8/2014 | Kitagawa | H01M 10/0404 29/509 |
| 2015/0270666 | A1* | 9/2015 | Callicoat | H01R 25/16 439/627 |

* cited by examiner

*Primary Examiner* — Erin Saad
(74) *Attorney, Agent, or Firm* — Patent Law Office of David G. Beck

(57) ABSTRACT

A method is provided for interconnecting the batteries in a battery pack in a manner that is designed to minimize damage and contamination of the contact surfaces of the interconnect and the battery terminal, thereby minimizing connection resistance and increasing interconnect reliability.

12 Claims, 6 Drawing Sheets

PRECONDITIONED BUS BAR INTERCONNECT SYSTEM

CROSS-REFERENCE TO RELATED APPLICATION

This application is a continuation-in-part of U.S. patent application Ser. No. 14/691,932, filed 21 Apr. 2015, the disclosure of which is incorporated herein by reference for any and all purposes.

FIELD OF THE INVENTION

The present invention relates generally to battery packs and, more particularly, to a battery pack bus bar interconnect system.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. One of the most common approaches to achieving a low emission, high efficiency car is through the use of a hybrid drive train in which an internal combustion engine is combined with one or more electric motors. An alternate approach that is intended to reduce emissions even further while simultaneously decreasing drive train complexity is one in which the internal combustion engine is completely eliminated from the drive train, thus requiring that all propulsive power be provided by one or more electric motors. Regardless of the approach used to achieve lower emissions, in order to meet overall consumer expectations it is critical that the drive train maintains reasonable levels of performance, range, reliability, and cost.

Irrespective of whether an electric vehicle (EV) uses a hybrid or an all-electric drive train, the battery pack employed in such a car presents the vehicle's design team and manufacturer with various trade-offs from which to select. For example, the size of the battery pack affects the vehicle's weight, performance, driving range, available passenger cabin space and cost. Battery performance is another characteristic in which there are numerous trade-offs, such as those between power density, charge rate, life time, degradation rate, battery stability and inherent battery safety. Other battery pack design factors include cost, both on a per battery and per battery pack basis, material recyclability, and battery pack thermal management requirements.

In order to lower battery pack cost and thus the cost of an EV, it is critical to reduce both component cost and assembly time. An area of pack fabrication that has a large impact on assembly time, especially for large packs utilizing small form factor batteries, is the procedure used to connect the batteries together, where the batteries are typically grouped together into modules which are then interconnected within the pack to achieve the desired output power. In a conventional pack, the high current interconnects that electrically connect each terminal of each battery to the corresponding bus bar are typically comprised of wire, i.e., wire bonds. Unfortunately wire bonding is a very time consuming, and thus costly, process and one which may introduce reliability issues under certain manufacturing conditions.

Accordingly, what is needed is a robust interconnect that allows the battery pack to be quickly and efficiently assembled, thus lowering manufacturing time and cost. The present invention provides such an interconnect design and manufacturing process.

SUMMARY OF THE INVENTION

The present invention provides a method of electrically interconnecting a plurality of batteries, the method comprising the steps of (i) fabricating a bus bar comprised of a plurality of interconnects configured to include at least one interconnect per battery, where the at least one interconnect includes (a) a first end portion formed as an extension of the bus bar and (b) a second end portion distal from the first end portion and configured to be attached to a battery terminal of a corresponding battery of the plurality of batteries, where the second end portion is comprised of a battery terminal contact tab, where the battery terminal contact tab is comprised of a sacrificial contact and a primary contact, and where the sacrificial contact is separate and distinct from the primary contact; (ii) pre-shaping the at least one interconnect prior to connecting it to a battery terminal, where the sacrificial contact is shaped to create a first separation distance between the battery terminal and a first contact surface corresponding to the sacrificial contact, where the primary contact is shaped to create a second separation distance between the battery terminal and a second contact surface corresponding to the primary contact, and where the second separation distance is greater than the first separation distance; (iii) contacting the first contact surface corresponding to the sacrificial contact to the battery terminal; (iv) contacting the second contact surface corresponding to the primary contact to the battery terminal, where the step of contacting the second contact surface to the battery terminal is performed after completion of the step of contacting the first contact surface to the battery terminal; and (v) attaching the primary contact to the battery terminal in order to form an electrical connection between the primary contact and the battery terminal. The step of attaching the primary contact to the battery terminal may utilize a technique selected from the group consisting of laser welding, e-beam welding, resistance welding, ultrasonic welding thermocompression bonding and thermosonic bonding. The sacrificial contact may also be attached to the battery terminal utilizing a technique selected from the group consisting of laser welding, e-beam welding, resistance welding, ultrasonic welding thermocompression bonding and thermosonic bonding.

In other aspects, (i) the step of fabricating the bus bar may further comprise fabricating the at least one interconnect such that the sacrificial contact is smaller than the primary contact; (ii) the step of fabricating the bus bar may further comprise fabricating the at least one interconnect as a tab extending from an edge of the bus bar; and (iii) the step of fabricating the bus bar may further comprise fabricating the bus bar and the plurality of interconnects from a single piece of material.

In another aspect, a force may be applied to the upper surface of the sacrificial contact in order to cause the first contact surface to touch the battery terminal. Additionally, a force may be applied to the upper surface of the primary contact in order to cause the second contact surface to touch the battery terminal, where the force is applied to the primary contact after completion of the step of applying force to the sacrificial contact.

In another aspect, the bus bar may be moved to a first position relative to the plurality of batteries, thereby causing the first contact surface to touch the battery terminal. Additionally, after the bus bar has been moved to the first position, the bus bar may be moved to a second position relative to the plurality of batteries, thereby causing the second contact surface to touch the battery terminal.

In another aspect, the plurality of batteries may be moved to a first position relative to the bus bar, thereby causing the first contact surface to touch the battery terminal. Additionally, after the plurality of batteries has been moved to the first position, the plurality of batteries may be moved to a second position relative to the bus bar, thereby causing the second contact surface to touch the battery terminal.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
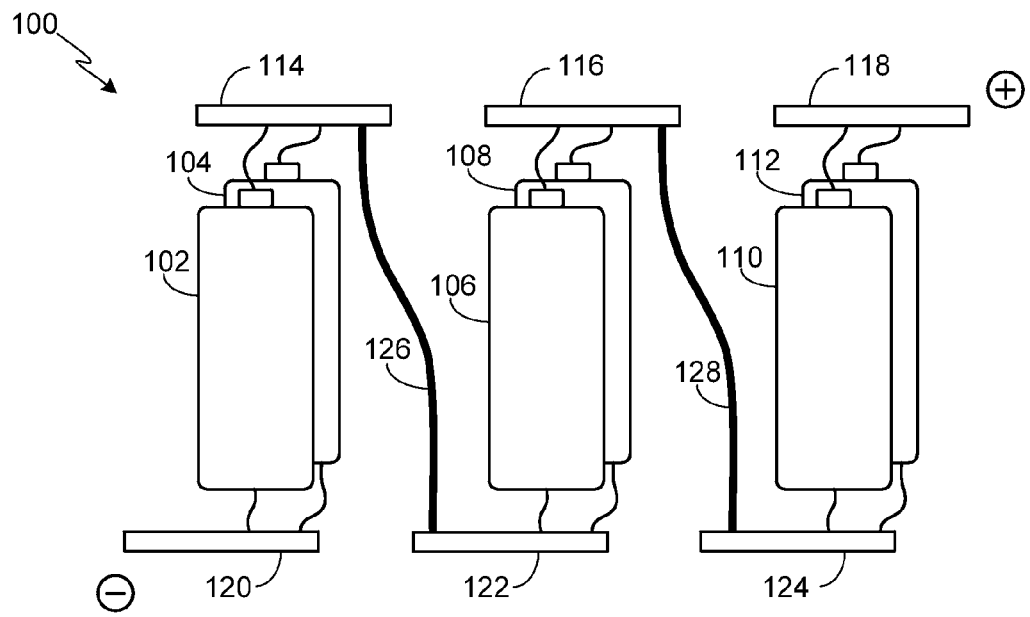
FIG. 1 is a schematic diagram of a battery pack with bus bars above and below the battery cells.

FIG. 1 illustrates an exemplary battery pack 100 illustrating a common battery pack configuration. As shown, battery pack 100 includes a first group of batteries 102 and 104 connected in parallel, a second group of batteries 106 and 108 connected in parallel, and a third group of batteries 110 and 112 connected in parallel. The first, second and third groups of batteries are connected in series. Bus bars 114, 116, 118, 120, 122, 124 are used to connect the batteries in this parallel and series arrangement. Each of the bus bars is coupled to the respective batteries with one or more interconnects. A relatively thick wire 126 couples the second bus bar 114 to the third bus bar 122, making a series connection between the first and second battery groups, while a second relatively thick wire 128 couples the fourth bus bar 116 to the fifth bus bar 124, making a series connection between the second and third battery groups. As a result, the first bus bar 120 is the negative terminal while the sixth bus bar 118 is the positive terminal for battery pack 100.

The use of bus bars at both ends of the batteries as illustrated in FIG. 1 requires a relatively complex manufacturing process in order to (i) attach the battery interconnects between the battery end surfaces and the bus bars, and (ii) attach the wires (e.g., wires 126 and 128) that couple the upper bus bars to the lower bus bars. Wires 126 and 128 are also problematic in the sense that they can introduce parasitic resistance into the current path, which in turn can introduce a voltage drop under high current drain conditions. Additionally this configuration prevents, or at least limits, the ability to efficiently remove battery pack heat by affixing a heat sink to a battery end surface.

Figure 2:
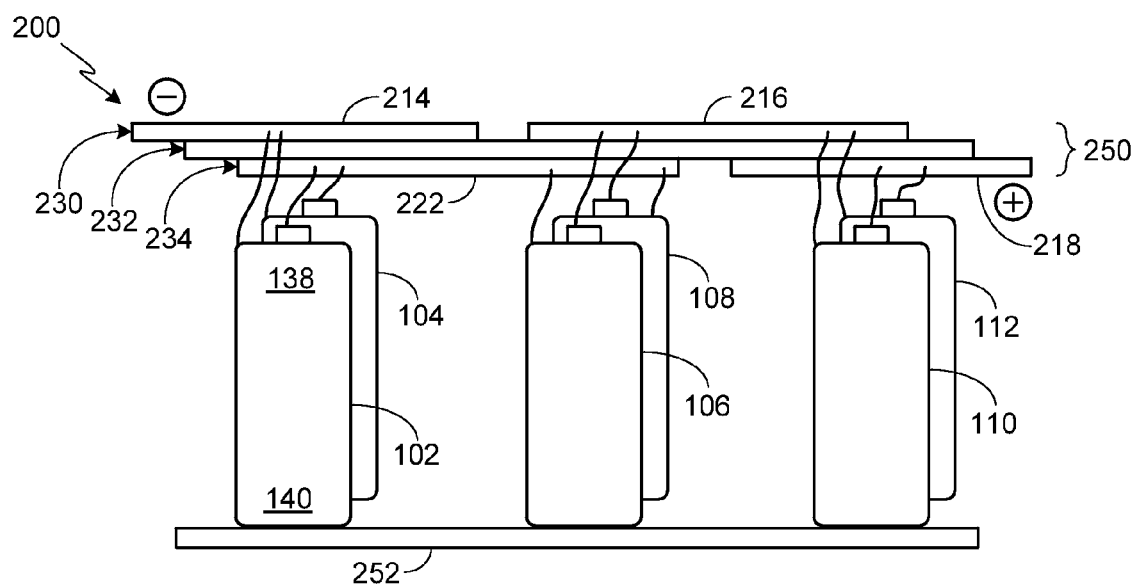
FIG. 2 is a schematic diagram of a battery pack with bus bars adjacent to the positive terminals of the battery cells.

FIG. 2 illustrates a battery pack 200 utilizing an alternate battery pack configuration in which all the bus bars are proximate to one end of the battery pack, thus enabling efficient heat removal from the other end of the battery pack. Furthermore, by locating bus bars 214, 216, 218 and 222 proximate to one end of the batteries, fewer bus bars are required than in battery pack 100. The relatively thick wires 126 and 128 from the upper bus bars to the lower bus bars are also eliminated in the embodiment shown in FIG. 2.

Access to both the positive and negative terminals in battery pack 200 is at one end of the cells, i.e., at the top end of the cells, where the bus bars are coupled to the positive and negative terminals using battery interconnects. As in the prior arrangement, the first group of batteries 102 and 104 are connected in parallel, the second group of batteries 106 and 108 are connected in parallel, and the third group of batteries 110 and 112 are connected in parallel. The first, second and third groups of batteries are connected in series. Bus bars 214, 216, 218, 222 are used to couple the batteries in this parallel and series arrangement. Specifically, starting with the negative terminal of battery pack 200, a first bus bar 214 is connected to the negative terminals of the first group of batteries 102 and 104 while a second bus bar 222 is connected to the positive terminals of the same group of batteries 102 and 104, both at the top end portion 138 of each of the batteries. The first and second bus bars 214 and 222 couple the first group of batteries 102 and 104 in parallel. Similarly, the second bus bar 222 and the third bus bar 216 couple the second group of batteries 106 and 108 in parallel, while the third bus bar 216 and the fourth bus bar 218 couple the third group of batteries 110 and 112 in parallel. Series connections between battery groups are formed by the bus bars, specifically the second bus bar 222 connects the positive terminals of the first group of batteries 102 and 104 to the negative terminals of the second group of batteries 106 and 108; and the third bus bar 216 connects the positive terminals of the second group of batteries 106 and 108 to the negative terminals of the third group of batteries 110 and 112. The fourth bus bar 218 is the positive terminal of the battery pack 200.

In battery pack 200 the bus bars are arranged in a layer stack 250. In this stacking arrangement first bus bar 214 and third bus bar 216, which are separated by an air gap or other electrical insulator to prevent short circuiting, are placed in a first layer 230. Similarly, second bus bar 222 and fourth bus bar 218, which are also separated by a gap or insulator, are placed in a third layer 234. Disposed between layers 230 and 234 is an electrically insulating layer 232. To simplify fabrication, the layer stack may be formed using layers of a circuit board, e.g., with the bus bars made of (or on) copper layers or other suitable conductive metal (such as aluminum) and the insulating layer made of resin impregnated fiberglass or other suitable electrically insulating material. It should be understood that layer stack 250 is simply an exemplary stack and that alternate bus bar arrangements may be used.

In a preferred embodiment, and as shown in the figures, the batteries have a projecting nub as a positive terminal at the top end of the battery and a can or casing that serves as the negative battery terminal. The batteries are preferably cylindrically shaped with a flat bottom surface. Typically a portion of the negative terminal is located at the top end of the cell, for example due to a casing crimp which is formed when the casing is sealed around the contents of the battery. This crimp or other portion of the negative terminal at the top end of the battery provides physical and electrical access to the battery's negative terminal. The crimp is spaced apart from the peripheral sides of the projecting nub through a gap that may or may not be filled with an insulator.

Preferably in a battery pack such as battery pack 200 in which the battery connections are made at one end of the cells (e.g., end portions 138), a heat sink 252 is thermally coupled to the opposite end portions 140 of each of the batteries. The heat sink may be finned or utilize air or liquid coolant passages. In some embodiments, a fan provides air flow across a surface of heat sink 252. In at least one embodiment, the heat sink is attached or affixed to the bottom of a battery holder. The co-planar arrangement of the batteries provides a relatively flat surface to attach a heat sink and in some embodiments the battery cells are designed to cool efficiently through the bottom of the cells, e.g., 18650 lithium ion batteries.

In order to eliminate many of the drawbacks associated with wire bond interconnects, the present invention utilizes tabs that extend from the bus bars and which are directly attached to the battery terminals. Although the manufacturing approach of the invention may be used with bus bar arrangements such as that shown in FIG. 1 in which a set of bus bars and battery interconnects is used on either end of the batteries, preferably the interconnect system of the invention is used with a configuration such as that shown in FIG. 2 in which both the positive and negative battery interconnects are coupled to the batteries via a single battery end portion.

Figure 3:
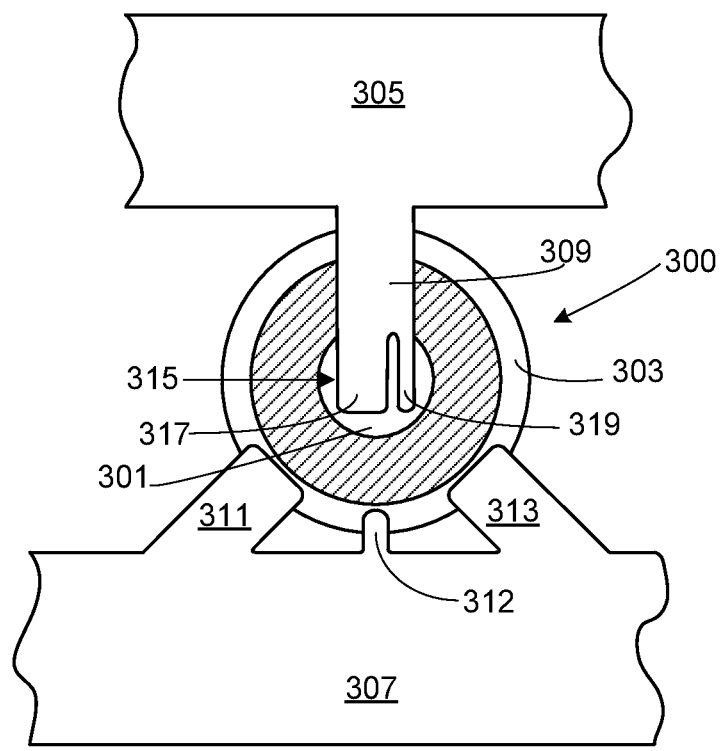
FIG. 3 provides a top view of a portion of a battery assembly, and in particular of the bus bar connections to a single battery.

FIG. 3 provides a top view of a portion of a battery pack, and more specifically of a single battery 301, similar in design to those shown in FIGS. 1 and 2, and portions of a pair of bus bars. Battery 300 includes a raised nub 301 that serves as one terminal of the battery, typically the positive terminal, while the top edge 303 of the battery 301 serves as the second terminal of the battery, typically the negative terminal. In a typical 18650 form factor battery, edge 303 is a part of the battery casing which is crimped to hold the cap assembly and the electrode assembly in place within the casing. It will be appreciated that the invention described in detail below is equally applicable to other battery configurations, for example non-cylindrical batteries.

In the illustration a pair of bus bars 305/307 is shown, where bus bar 305 is electrically connected to terminal 301 via a single interconnect 309, and bus bar 307 is electrically connected to terminal 307 via multiple interconnect tabs 311-313. Preferably the interconnects, i.e., interconnects 309 and 311-313, are fabricated in the same manufacturing process used to fabricate the bus bars. Alternately the interconnects may be formed in a secondary process.

During assembly of a battery pack, an issue that may arise is arcing. If the battery, e.g., battery 300, is charged or partially charged and the interconnect is at a different potential, then when the interconnect first touches the battery terminal during the battery coupling process an arc may form at or near the point of contact between the surface of the interconnect and the battery terminal. While it is unlikely that such an arc will damage the battery or any other component of the battery assembly, it may damage the surface of the battery terminal and/or the interconnect. Typical surface damage includes surface pitting and/or surface contamination. Although this surface damage may appear minimal, it can increase the electrical resistance of the interconnect at the point of contact between the interconnect and the battery. Surface damage may also affect the strength of the interconnect coupling, e.g., the weld, leading to battery pack reliability issues.

In accordance with the invention, when coupling a bus bar to a battery, an initial contact is made between the two components using a sacrificial contact. Thus any arcing that may occur during the battery coupling process occurs at or near the point of contact between the interconnect's sacrificial contact and the battery terminal, thus allowing the point of contact between the actual interconnect and the battery terminal to remain undamaged during the battery coupling process.

As disclosed herein, there are two primary approaches to providing a sacrificial contact between the bus bar interconnect(s) and each of the battery terminals. The first approach utilizes a secondary interconnect as the sacrificial contact while the second approach utilizes a secondary contact on the single interconnect's connection tab as the sacrificial contact. Both approaches are discussed in detail below.

FIG. 3 shows three tabs 311-313 that comprise the interconnects between bus bar 307 and one of the battery terminals, e.g., casing terminal 303. One of the interconnects, and preferably the smallest interconnect 312, is designated as the sacrificial interconnect. As such, during the battery pack assembly process interconnect 312 is configured to touch the battery terminal, e.g., terminal 303, before the non-sacrificial interconnects 311 and 313. It will be appreciated that one of the interconnects 311 and 313 is redundant, and therefore is unnecessary for the battery pack to operate as intended. Accordingly, one of these two interconnects 311 and 313 may be eliminated without affecting the performance of the invention.

Figure 4:
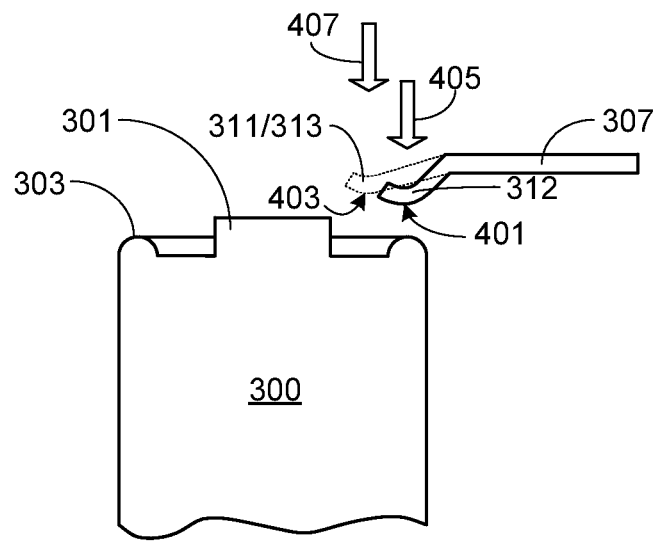
FIG. 4 provides a side view of a bus bar and associated interconnect tabs shown in FIG. 3 prior to the interconnect contact attachment process.

FIG. 4 provides a side view of bus bar 307 prior to the coupling process. As shown, the battery contact 401 on sacrificial interconnect 312 is lower, i.e., closer to the surface of battery 300, than the battery contact 403 on the non-sacrificial interconnects 311/313. For figure clarity, the non-sacrificial contacts 311/313 are shown in phantom. Since sacrificial interconnect 312 is closer than primary interconnects 311/313 to the surface of the battery, as the battery is moved closer to the interconnects, or as the interconnects are moved closer to the battery, the sacrificial interconnect will touch the battery terminal before the primary interconnects. The shape of the interconnects as well as the relative locations relative to battery 300 may be achieved by pre-shaping the tabs during bus bar manufacturing, for example by bending the interconnect tabs to the desired shape.

In an alternate approach, during the battery coupling process a force may be applied to sacrificial contact 312 that causes it to touch the surface of the intended battery terminal prior to the non-sacrificial contacts touching the surface of the same battery terminal. Typically in this process, a force is first applied in direction 405 to sacrificial contact 312, causing it to touch the battery terminal, followed by a force being applied in direction 407 to contacts 311/313.

Figure 5:
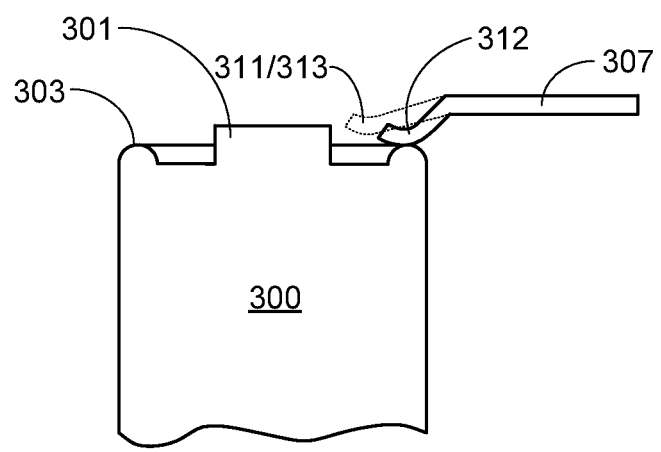
FIG. 5 provides a side view of the assembly shown in FIG. 4 after initial contact is made between the sacrificial interconnect tab and the battery terminal.
Figure 6:
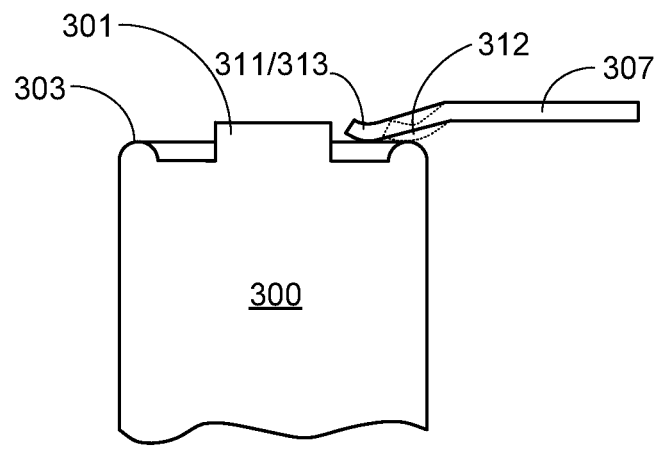
FIG. 6 provides a side view of the assembly shown in FIGS. 4 and 5 after final contact is made between all of the bus bar interconnect tabs and the battery casing terminal.

FIG. 5 provides a side view of bus bar 307 after initial contact is made between sacrificial interconnect tab 312 and the battery terminal, while FIG. 6 provides a side view of bus bar 307 after final contact is made between all interconnect tabs 311-313 and the battery casing terminal 303. Note that in FIG. 6 interconnect 312 is shown in phantom rather than interconnect tabs 311/313.

As noted above, rather than utilizing a separate interconnect for the sacrificial interconnect, a single interconnect tab can include both the primary contact and a sacrificial contact. This arrangement is illustrated relative to interconnect 309 in FIG. 3. As shown in the figure, interconnect 309 includes a battery terminal contact tab 315. Contact tab 315 is divided into two contacts, the primary contact 317 and the sacrificial contact 319.

Figure 7:
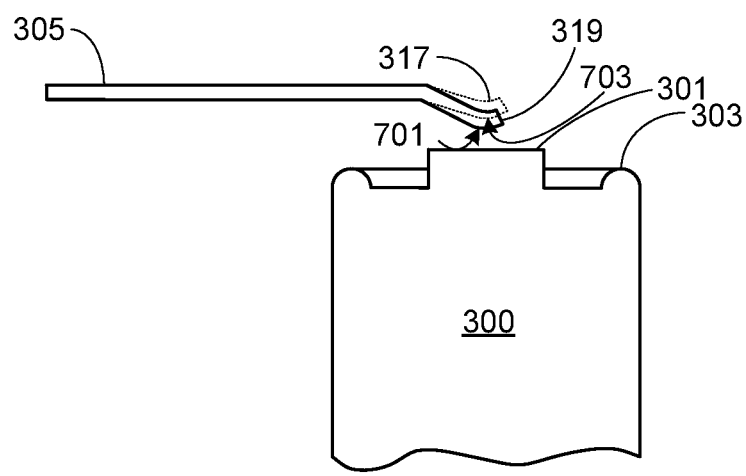
FIG. 7 provides a side view of the bus bar and interconnect shown in FIG. 3 prior to the interconnect contact attachment process.

FIG. 7 provides a side view of bus bar 305 and battery terminal contact tab 315 prior to the coupling process. As shown, the contact surface 701 on sacrificial contact 319 is lower, i.e., closer to the surface of battery 300, than the contact surface 703 on the non-sacrificial, primary contact 317. For figure clarity, the primary contact 317 is shown in phantom. Since contact surface 701 of the sacrificial contact 319 is closer than the contact surface 703 of the primary contact 317 to the surface of the battery, as the battery is moved closer to the interconnect, or as the interconnect is moved closer to the battery, the contact surface of the sacrificial contact will touch the battery terminal before the contact surface of the primary contact. As with the previously described interconnects, the shape of the contact regions on contact tab 315 may be achieved by pre-shaping, i.e., bending, the contact regions of tab 315.

Figure 8:
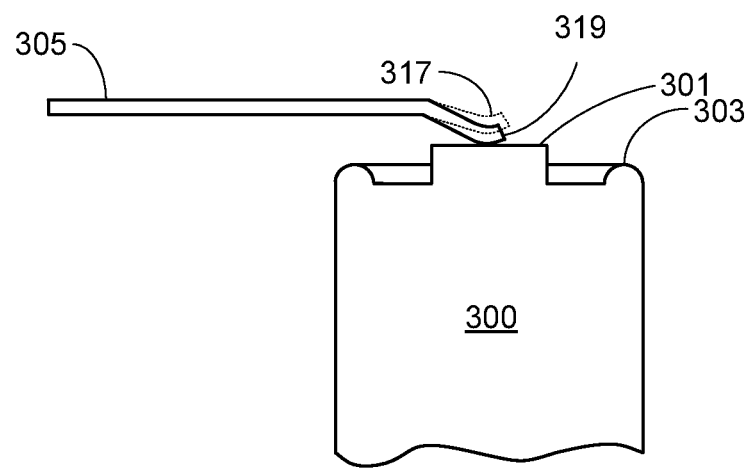
FIG. 8 provides a side view of the assembly shown in FIG. 7 after initial contact is made between the sacrificial interconnect contact and the battery terminal.
Figure 9:
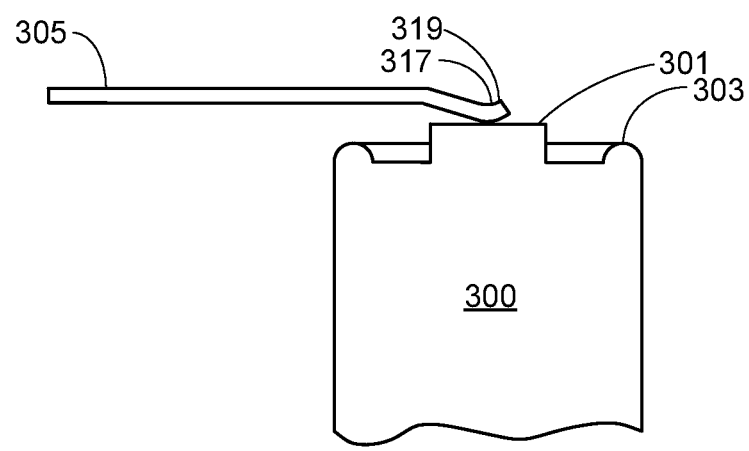
FIG. 9 provides a side view of the assembly shown in FIGS. 7 and 8 after final contact is made between both the primary and sacrificial interconnect contacts and the battery terminal.

In an alternate approach, during the battery coupling process a force may be applied to the upper surface of the sacrificial contact 319 that causes it to touch the surface of the intended battery terminal prior to the primary contact touching the surface of the same battery terminal. FIG. 8 provides a side view of bus bar 305 after initial contact is made between sacrificial contact 319 and battery terminal 301, while FIG. 9 provides a side view of bus bar 305 after final contact is made between both contacts 317/319 and battery terminal 301.

Figure 10:
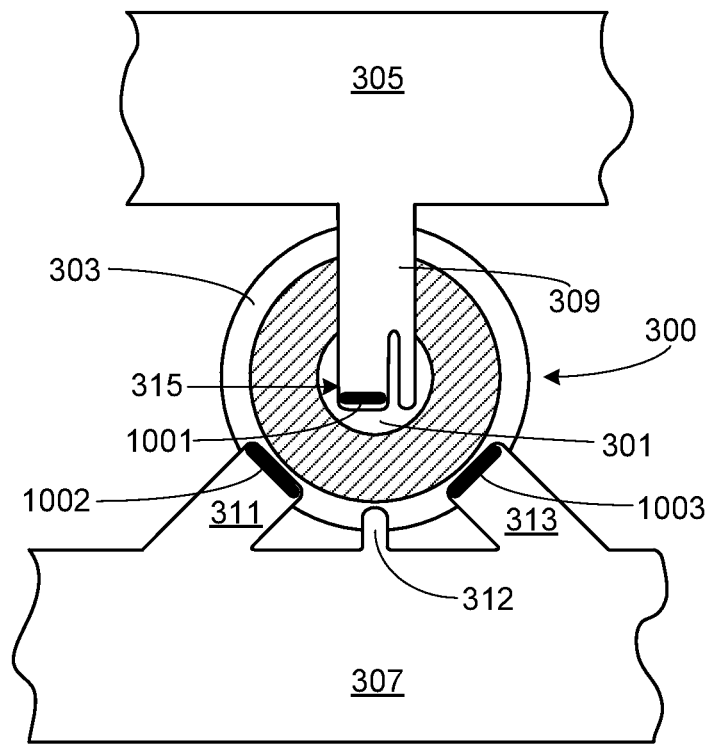
FIG. 10 illustrates the embodiment shown in FIG. 3 with the primary interconnect contacts welded to the underlying battery terminals while the sacrificial interconnect contacts remain unattached.
Figure 11:
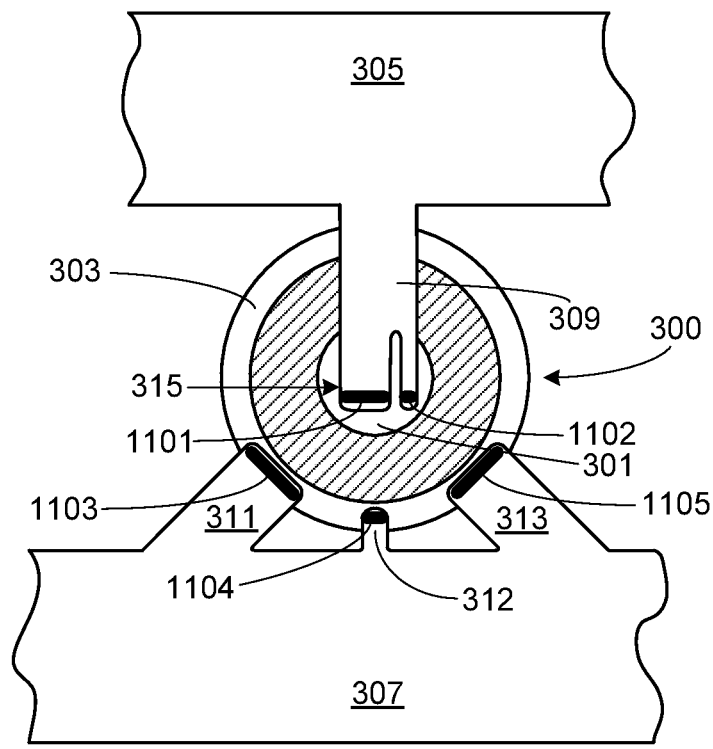
FIG. 11 illustrates the embodiment shown in FIG. 3 with both the primary and sacrificial interconnect contacts welded to the underlying battery terminals.

Once the contacts corresponding to each of the interconnects are properly positioned relative to the battery terminals, the interconnect contacts are attached to the terminals. Preferably the interconnect contacts are laser welded in place, although it should be understood that other attachment techniques may be used such as e-beam welding, resistance welding, ultrasonic welding, thermocompression bonding, thermosonic bonding, etc. As the purpose of the sacrificial contacts (e.g., interconnect contacts 312 and 319) is to prevent arcing between the battery terminals and the primary interconnect contacts (e.g., interconnect contacts 311, 313 and 317), thereby avoiding contact damage and contamination at the actual point of contact between the battery terminals and the primary interconnect contacts, it is not necessary for the sacrificial interconnect contacts to be welded or otherwise attached to the battery terminals. FIG. 10 illustrates the embodiment shown in FIG. 3 with the primary interconnect contacts welded to the underlying battery terminals via laser weld joints 1001-1003, while the sacrificial interconnect contacts remain unattached to the contacted battery terminals. FIG. 11 illustrates the embodiment shown in FIG. 3 with both the primary and sacrificial interconnect contacts welded to the underlying battery terminals via laser weld joints 1101-1105.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of electrically interconnecting a plurality of batteries, said method comprising:
fabricating a bus bar, said bus bar comprising a plurality of interconnects configured to include at least one interconnect per battery of said plurality of batteries, said at least one interconnect comprising:
a first end portion formed as an extension of said bus bar;
a second end portion distal from said first end portion and configured to be attached to a battery terminal of a corresponding battery of said plurality of batteries, wherein said second end portion is comprised of a battery terminal contact tab, wherein said battery terminal contact tab is comprised of sacrificial contact and a primary contact, wherein said sacrificial contact is separate and distinct from said primary contact;

pre-shaping said sacrificial contact and said primary contact prior to contacting said at least one interconnect to said battery terminal, wherein said step of pre-shaping creates a first separation distance between a first contact surface corresponding to said sacrificial contact and said battery terminal, and creates a second separation distance between a second contact surface corresponding to said primary contact and said battery terminal, wherein said second separation distance is greater than said first separation distance;

contacting said first contact surface corresponding to said sacrificial contact to said battery terminal;

contacting said second contact surface corresponding to said primary contact to said battery terminal, wherein said step of contacting said second contact surface to said battery terminal is performed after completion of said step of contacting said first contact surface to said battery terminal; and attaching said primary contact to said battery terminal, wherein said step of attaching forms an electrical connection between said primary contact and said battery terminal.

2. The method of claim 1, said step of fabricating said bus bar further comprising fabricating said at least one interconnect such that said sacrificial contact is smaller than said primary contact.

3. The method of claim 1, said step of fabricating said bus bar further comprising fabricating said at least one interconnect as a tab extending from an edge of said bus bar.

4. The method of claim 1, further comprising the step of attaching said primary contact to said battery terminal using a technique selected from the group consisting of laser welding, e-beam welding, resistance welding, ultrasonic welding thermocompression bonding and thermosonic bonding.

5. The method of claim 4, further comprising the step of attaching said sacrificial contact to said battery terminal using a technique selected from the group consisting of laser welding, e-beam welding, resistance welding, ultrasonic welding thermocompression bonding and thermosonic bonding.

6. The method of claim 1, said step of fabricating said bus bar further comprising fabricating said bus bar and said plurality of interconnects from a single piece of material.

7. The method of claim 1, said step of contacting said first contact surface corresponding to said sacrificial contact to said battery terminal further comprising applying a force on an upper surface of said sacrificial contact, wherein said step of applying said force causes said first contact surface to touch said battery terminal.

8. The method of claim 7, said step of contacting said second contact surface corresponding to said primary contact to said battery terminal further comprising applying a second force on an upper surface of said primary contact, wherein said step of applying said second force causes said second contact surface to touch said battery terminal, and wherein said step of applying said second force is performed after completion of said step of applying said force on said upper surface of said sacrificial contact.

9. The method of claim 1, said step of contacting said first contact surface corresponding to said sacrificial contact to said battery terminal further comprising moving said bus bar to a first position relative to said plurality of batteries, wherein said step of moving said bus bar to said first position causes said first contact surface to touch said battery terminal.

10. The method of claim 9, said step of contacting said second contact surface corresponding to said primary contact to said battery terminal further comprising moving said bus bar to a second position relative to said plurality of batteries, wherein said step of moving said bus bar to said second position causes said second contact surface to touch said battery terminal, and wherein said step of moving said bus bar to said second position is performed after completion of said step of moving said bus bar to said first position.

11. The method of claim 1, said step of contacting said first contact surface corresponding to said sacrificial contact to said battery terminal further comprising moving said plurality of batteries to a first position relative to said bus bar, wherein said step of moving said plurality of batteries to said first position causes said first contact surface to touch said battery terminal.

12. The method of claim 11, said step of contacting said second contact surface corresponding to said primary contact to said battery terminal further comprising moving said plurality of batteries to a second position relative to said bus bar, wherein said step of moving said plurality of batteries to said second position causes said second contact surface to touch said battery terminal, and wherein said step of moving said plurality of batteries to said second position is performed after completion of said step of moving said plurality of batteries to said first position.

* * * * *